July 14, 1964 T. R. MUTTO 3,140,882
VEHICLE COUPLERS
Filed Aug. 4, 1961 3 Sheets-Sheet 1

INVENTOR.
THEODORE R. MUTTO
BY
Meyer, Baldwin, Doran & Egan
ATTORNEYS

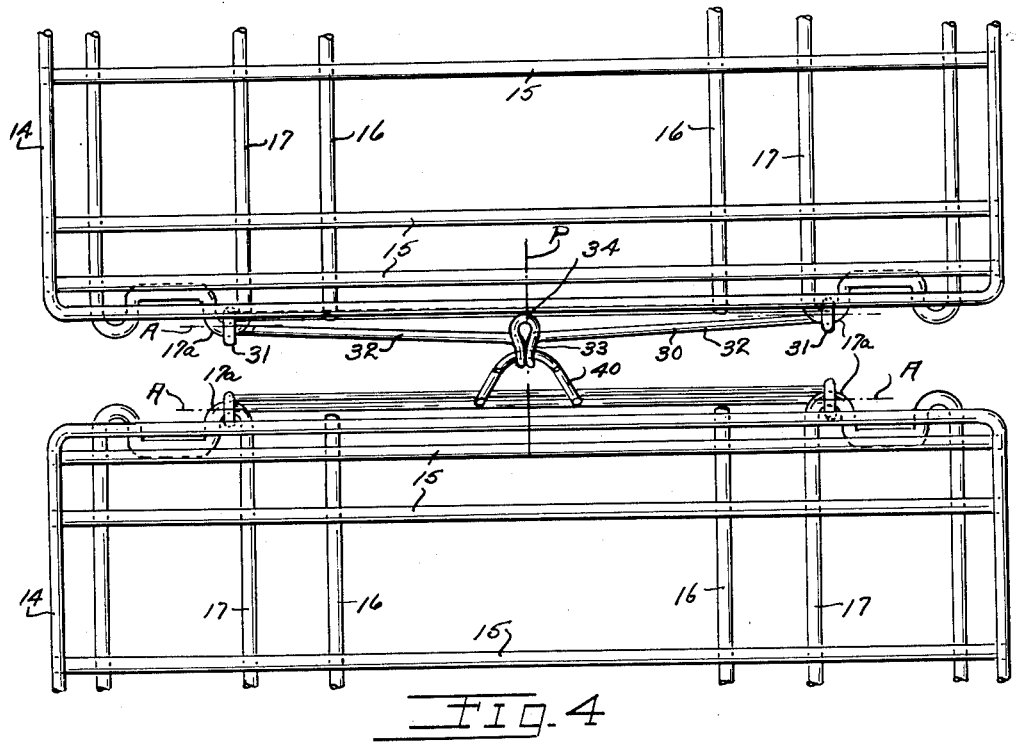
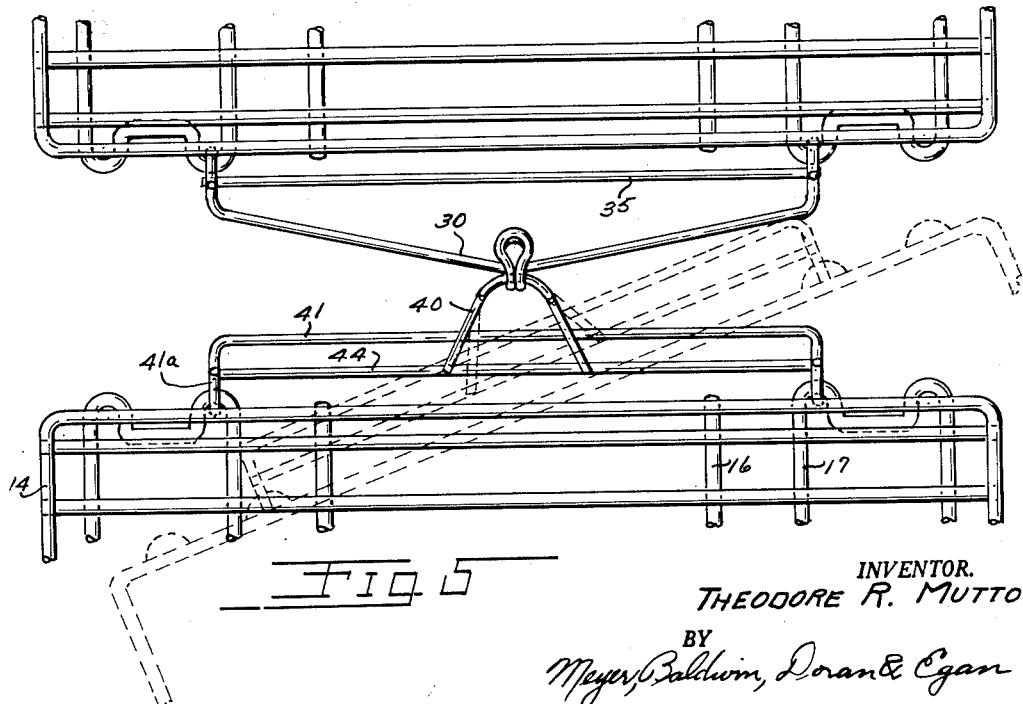

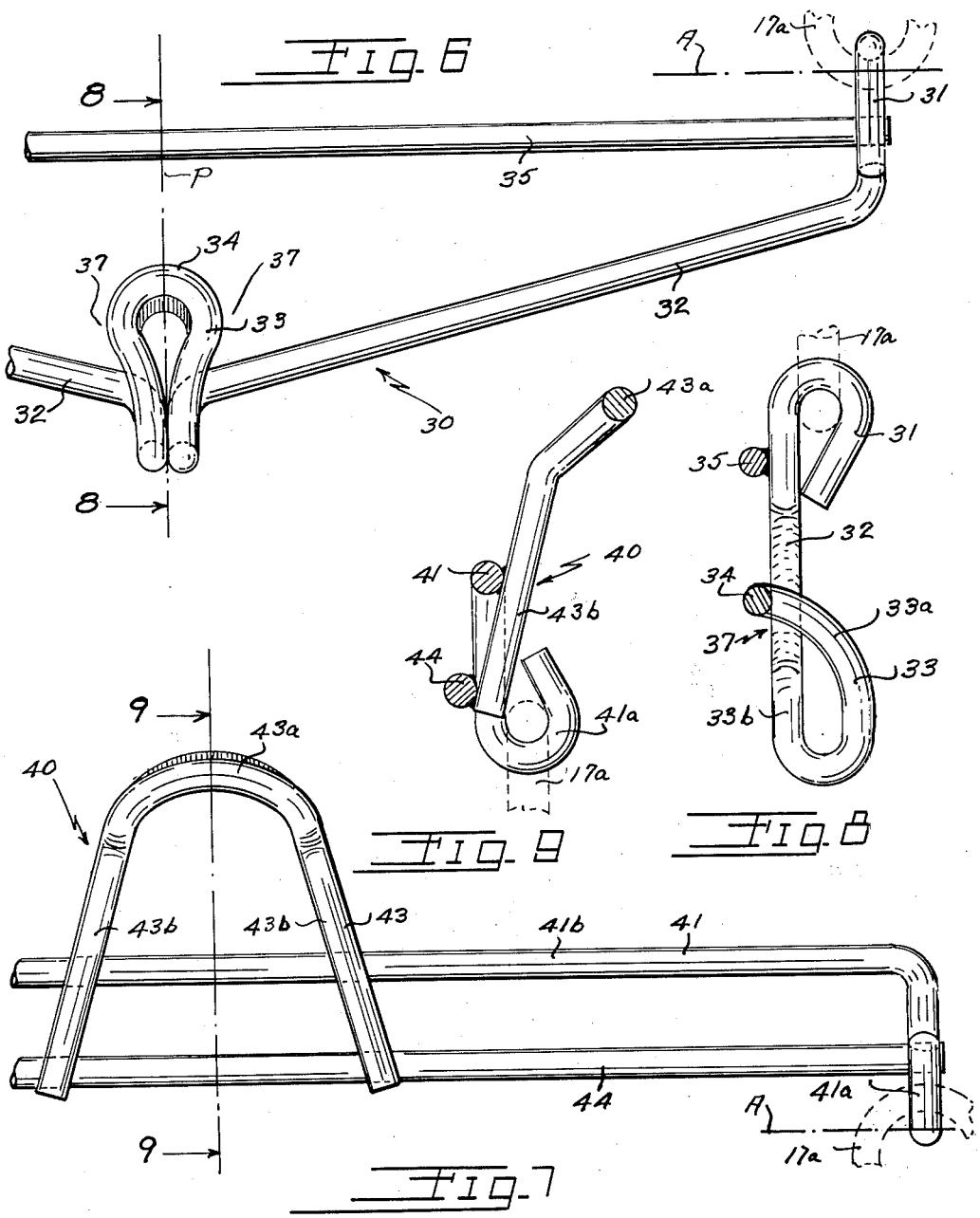

United States Patent Office 3,140,882
Patented July 14, 1964

3,140,882
VEHICLE COUPLERS
Theodore R. Mutto, Shaker Heights, Ohio, assignor to Nestaway Incorporated, Cleveland, Ohio, a corporation of Ohio
Filed Aug. 4, 1961, Ser. No. 192,451
1 Claim. (Cl. 280—481)

This invention relates to improvements in vehicle couplers.

One of the objects of the present invention is to provide vehicle couplers of simple construction readily movable between coupled and uncoupled relationships.

A further object of the present invention is to provide vehicle couplers characterized by their inexpensive manufacturing cost, ease of assembly of their component parts, structural simplicity, strong and sturdy nature, compactness in design, and ease of use in being moved between coupled and uncoupled relationship.

Other features of the invention reside in the arrangement and design of the parts for carrying out their appropriate functions.

Other objects and advantages of this invention will be apparent from the accompanying drawings and description and the essential features will be set forth in the appended claim.

In the drawings,

FIG. 4 is a top plan view of FIG. 2;

FIG. 5 is a top plan view of FIG. 3;

FIG. 6 is a front view of a portion of one of the couplers in FIG. 1;

FIG. 7 is an inverted front view of a portion of the other coupler in FIG. 1;

FIG. 8 is a vertical sectional view taken generally along the line 8—8 in FIG. 6;

FIG. 9 is a vertical sectional view taken generally along the line 9—9 in FIG. 7; while

Figure 1:
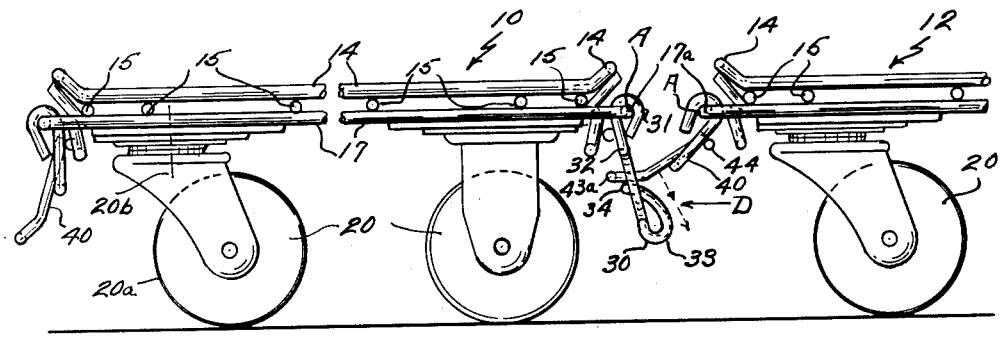
FIG. 1 is a side elevational view of two vehicles having their couplers in uncoupled relationship in the uncoupling position.

Before the couplers here illustrated are specifically described, it is to be understood that the invention here involved is not limited to the structural details or arrangement of parts here shown since couplers and vehicles embodying the present invention may take various forms. It also is to be understood that the phraseology or terminology herein employed is for purposes of description and not of limitation since the scope of the present invention is denoted by the appended claim.

Two vehicles 10 and 12 are shown in FIGS. 1 to 5. Each vehicle may be of any suitable construction and is illustrated herein as including a four sided framing bar 14 forming four sides of the vehicle, a plurality of longitudinally spaced apart cross bars 15, a plurality of transversely spaced apart longitudinal bars 16, and two closed loops 17 welded or otherwise secured together. Each vehicle has a plurality of wheels 20, such as four in number, secured to its lower surface with each wheel 20a rotatable about a horizontal axis and two of them also being caster wheels pivotally movable about a vertical axis 20b relative to the body of the vehicle.

Couplers 30 and 40 are respectively carried by vehicles 10 and 12.

Male coupler 30 comprises one bar bent into an end loop 31 at each end bent around a pivot portion 17a on one of the loops 17 for movement about horizontal pivot axis A, symmetrical coplanar bar portions 32 converging away from pivot axis A into hook 33 bent upon itself between converging portions 32 first away from the plane of members 32 and away from the vehicle and then upwardly and back through the plane at the distal end 34; and a second bar 35 serving as a cross bar welded or otherwise secured at opposite ends to loops 31. These bar portions form a clearway 37 between hook 33 and each bar portion 32 for a purpose to be described more in detail hereinafter.

Female coupler 40 has a support bar 41 having opposite ends bent into loops 41a around pivot portion 17a to provide pivotal movement of the coupler about horizontal pivot axis A and having central cross portion 41b connecting these end loops; cross bar 44 welded at opposite ends to loops 41a; and generally U-shape member 43, having bight portion 43a and having legs 43b, each leg being welded to bars 41 and 44. Coupler 40 has generally U-shape member 43 constructed with its bight portion 43a of the U-shape spaced below and farthest from its pivot axis A.

Now, it should be apparent that each coupler 30 or 40 is secured on a horizontal pivot axis A to its respective vehicle 10 or 12 for swinging movement about this axis, and each coupler has a symmetrical construction about vertical longitudinal plane P of movement of its vehicle.

Figure 2:
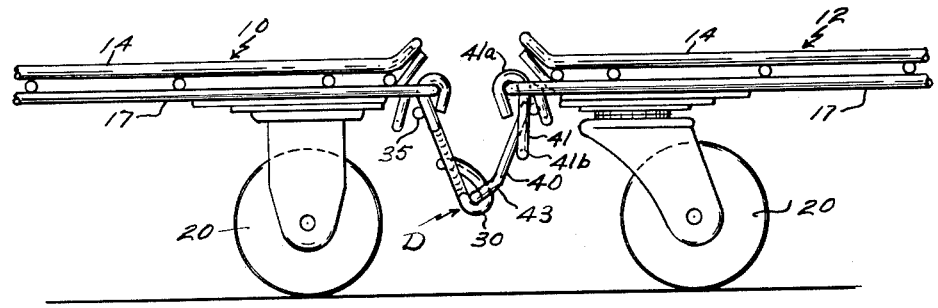
FIG. 2 is a side elevational view of the couplers in coupled relationship in the uncoupling position.
Figure 3:
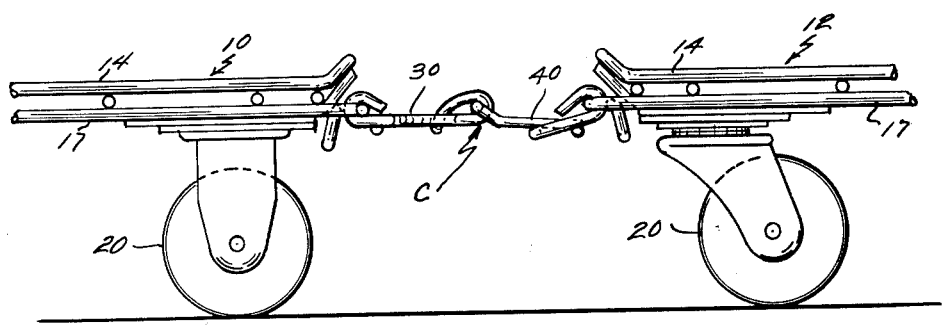
FIG. 3 is a side elevational view of the couplers in a pulling position.
Figure 10:
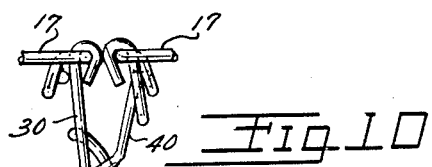
FIG. 10 is a side elevational view of the couplers and portions of their associated vehicles in pushing position.

Couples 30 and 40 are swingable between pulling position C in FIG. 3 established by a pulling action of one vehicle on the other vehicle, such as vehicle 10 pulling vehicle 12; uncoupling position D in FIGS. 1 and 2; and pushing position F in FIG. 10 established by a pushing action of one vehicle on the other vehicle, having either the vehicles and/or couplers engaged, and having the couplers extending downwardly from pivot axes A.

In uncoupling position D in FIG. 2 each coupler is located arcuately between its pulling position C in FIG. 3 and pushing position F in FIG. 10, and is adapted to be swung between the coupled relationship shown in FIG. 2 and the uncoupled relationship shown in FIG. 1. This action is possible because coupler 30 has a clearway 37, located between hook 33 and each bar portion 32, to permit U-shaped member 43 of coupler 40 to be moved between this coupled and uncoupled relationship in this uncoupling position D. U-shaped member 43 is shaped to travel through clearway 37 in position D but to have coupling engagement with hook 33 in both pushing position F and pulling position C. When the vehicles are in uncoupling position D, any pulling or pushing movement of one vehicle relative to the other vehicle automatically securely couples these couplers during movement toward the pulling position C or pushing position F respectively.

In all positions except uncoupling position D, the couplers are prevented from having an uncoupling action. Distal portion 33a of hook 33 prevents uncoupling action between uncoupling position D and pulling position C; and base portion 33b of hook 33 prevents uncoupling action between uncoupling position D and pushing position F.

Coupled vehicles 10 and 12, detachably connected by couplers 30 and 40, can turn in a small turning radius, as shown by the dotted line position in FIG. 5, because bar portions 32 and 43b converge away from their respective pivot axes A and bight portion 43a is curved.

When uncoupled, each coupler 30 or 40 hangs downwardly freely by gravity from its pivot axis A in a generally vertical plane in uncoupler relationship to minimize lateral projection from its vehicle 10 or 11 so that the vehicles can be parked close to each other without interference and so that each vehicle has a minimum lateral dimension.

Various changes in details and arrangement of parts may be made by one skilled in the art without departing from either the spirit of this invention or the scope of the appended claim.

What is claimed is:

A combination of two couplers for detachably connecting two vehicles wherein one of said couplers is adapted to be secured on a horizontal pivot axis to one of said vehicles and the other of said couplers is adapted to be secured on a horizontal pivot axis to the other of said vehicles, each coupler being an integral rigid member normally hanging downwardly by gravity from its pivot axis and constructed for swinging movement between a pushing position established by pushing action of one vehicle on the other vehicle, a pulling position established by a pulling action of one vehicle on the other vehicle, and an uncoupling position having each coupler located between said pulling and pushing positions; one of said couplers having co-planar support members extending from its associated pivot axis and terminating in a hook bent first away from the plane of said support members and away from its associated vehicle, then bent upwardly and then toward its associated vehicle and through said plane at the distal end of said hook, the other of said couplers having support members extending from its associated pivot axis and terminating in a transverse U-shape member having its bight portion farthest from its associated pivot axis, whereby said U-shape member is adapted to be passed over to embrace said hook and said U-shape member bight portion will lie approximately in the bottom of the bend of said hook when the two vehicles are in pushing engagement thereby preventing uncoupling, and said distal end of said hook preventing uncoupling when the two vehicles are in a pulling position.

References Cited in the file of this patent

FOREIGN PATENTS 282,003    Germany _____ Nov. 13, 1913